Figure 7:
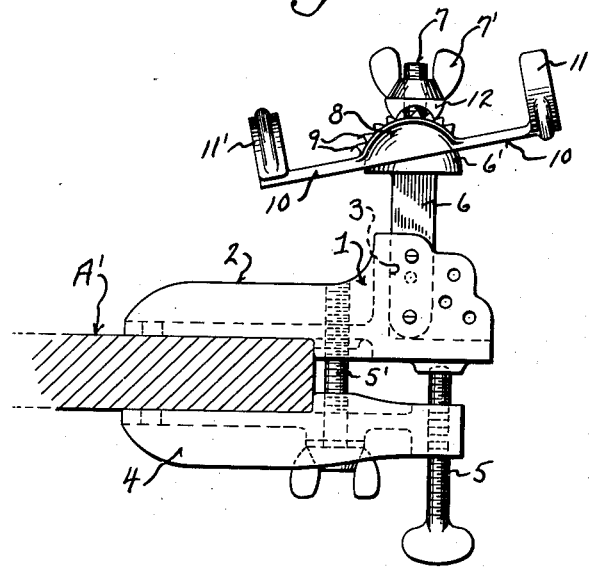

March 29, 1949.     H. R. AGNER     2,465,565
FISH ROD HOLDER
Filed March 20, 1948                    2 Sheets-Sheet 1
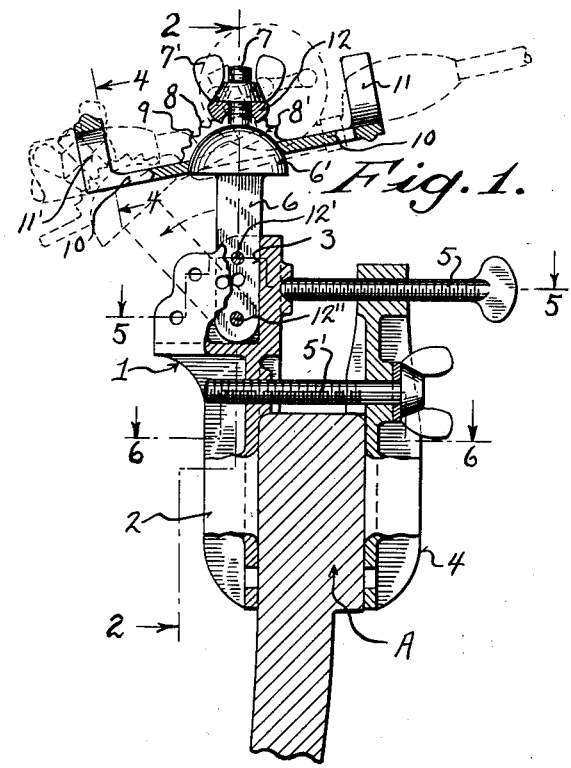
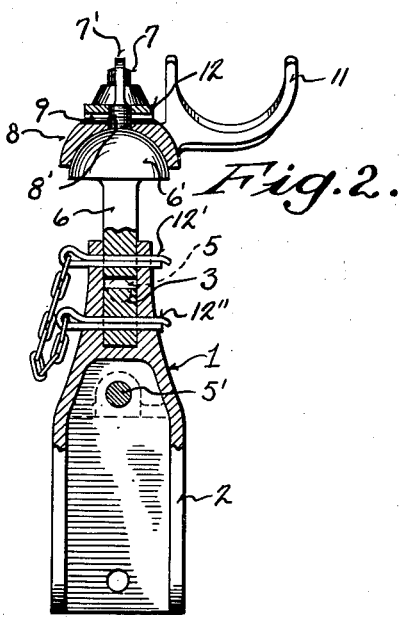
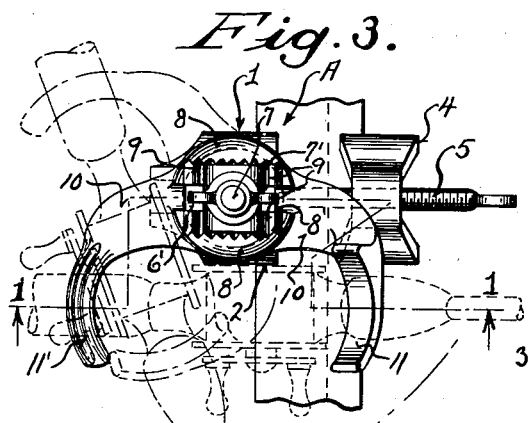
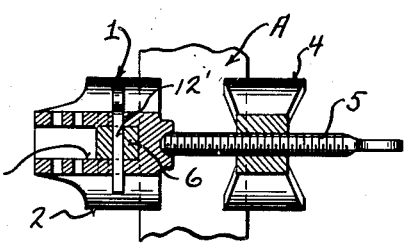
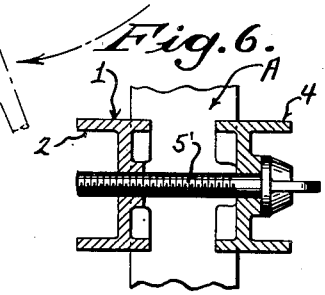
INVENTOR
HUGH R. AGNER
BY
ATTORNEYS March 29, 1949.  H. R. AGNER  2,465,565
FISH ROD HOLDER Filed March 20, 1948  2 Sheets-Sheet 2

INVENTOR
HUGH R. AGNER
BY
ATTORNEYS

Patented Mar. 29, 1949

2,465,565

UNITED STATES PATENT OFFICE 2,465,565

FISH ROD HOLDER

Hugh R. Agner, Burlington, Wis.

Application March 20, 1948, Serial No. 16,031

3 Claims. (Cl. 248—42)

My invention refers to fishpole holders, and it has for its primary object to provide, a bolt carrying a semi-spherical head, associated with a centrally positioned slotted cup. The cup is provided with arms terminating with horizontally disposed offset upper and lower forks, whereby the vertical angle of a pole seated in the forks may be varied indefinitely. The armed cup may also be horizontally swiveled, in a complete circle, to position the line end of a pole, at a desired fishing point, it being understood that the equipment is to be attached, either to the gunwale or seats of a boat.

The semi-spherical head has depending therefrom, a rectangular shank that is carried by an anchored bracket, the same being attached to a boat, and under general conditions, the shank is pivoted within a socket of the bracket and adjustably secured to said bracket socket, irrespective of the particular means for securing the said bracket to a selected part of a boat.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings, Figure 1, represents a sectional elevation of a fishpole holder embodying the features of my invention, the section being indicated by line 1—1 of Figure 3.

Figure 2, a sectional end elevational of the same, the section being indicated by line 2—2 of Figure 1.

Fig. 3, a plan view of the bracket is shown in Fig. 1, indicating in dotted outline different positions of fish pole carried by it.

Figure 4, a detailed sectional view through the rod holder arm and fork, the section being indicated by line 4—4 of Figure 1.

Figure 5, a plan sectional view of the bracket mechanism, the section being indicated by line 5—5 of Figure 1.

Figure 6, is another sectional elevation, the same being indicated upon a plane on line 6—6 of Figure 1.

Figure 7, a face view of another form of clamping bracket for the holder.

Figure 8:
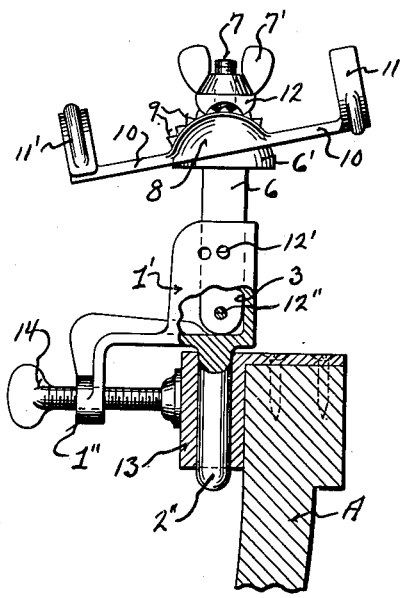
Figure 9:
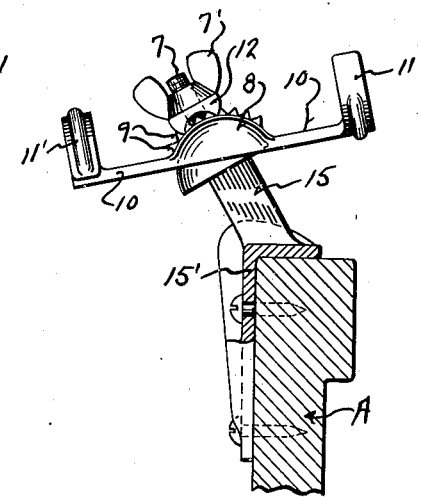

Figure 8, a similar elevation of still another form of holder bracket, parts from it being broken away and in section to more clearly illustrate structural features, and Figure 9, another form of holder bracket wherein the headed standard for the holder is an integral part of the bracket member.

Referring by characters to the drawings, A indicates the gunwale of a boat, having fitted thereto to a bracket 1, having a depending clamping lug 2 and an upper slotted pocket 3.

The bracket is fitted to the outer face of the boat gunwale A and is associated with a clamp pad 4, which pad is fitted to the inner face of the gunwale.

The bracket 1 and clamp pad 2 are secured together by thumb bolts 5—5', the lower thumb bolt 5' is in threaded union with the lug 2, of pocket 1 and the upper bolt is in threaded union with the clamp 4 and abuts the bracket whereby the same is firmly held in all directions.

The bracket pocket 3, has fitted therein a rectangular shank 6, which shank terminates at its upper end with a semi-spherical head 6'. The head has centrally extending therefrom a bolt 7.

Mounted upon the head 6' is a semi-spherical cup 8, which cup is formed with a central slot 8' through which the bolt 7' extends. The head is also provided with companion sets, of transversely disposed corrugations 9, as best indicated in Figures 1 and 3.

The spherical head 8, has extending therefrom, a pair of arms 10 and said arms terminate with an upwardly open yoke 11 and the downwardly open yoke 11', the said yokes being offset from the head, whereby as indicated in dotted lines, Figures 1 and 3, a fishing rod may be held. it being understood that the said fishing rod may be of the common pole type, or it may be equipped with a casting reel.

The holder arms and associated cup, may be vertically adjusted upon the head 6', whereby the angle of the arms and its fishing rod or pole, may be vertically determined.

As indicated in Figures 1 to 3 of the drawings, when the holding arms are adjusted to the desired angle, they are locked in such position by a toothed block 12, which engages the corrugation in the cup 8 and said toothed block is then firmly secured, by a thumb nut 7' which thumb nut, firmly seats the cup upon the head 6' in its selected angular position.

Thus, it will be noted that the vertical angle of the pole may be determined and at the same time, horizontal circular position of the pole, may also be determined by rotation of the armed pole holder upon its head.

A further fixed adjustment of the pole holder is accomplished, due to the fact that the end of the head shank 6, is pivoted within the pocket 3, of the bracket and from said pivot, the shank may be tilted, as indicated in dotted lines, Figure 1, whereby another angular position is determined and the shank 6, is locked in this angular position, by a pin 12' which engages, selective aperture in the side walls of the pocket 3 and a corresponding aperture in the head shanks 6.

As shown in Figure 2 of the drawings, the pin 12 and shank pivot 12'', are preferably in the form of split keys, which are connected by a chain.

Referring to Figure 7 of the drawings, the bracket 1 and associated parts are fitted to the edge of a boat seat A', the said bracket being clamped, by the same mechanism described in Figure 1 of the drawings.

Figure 8 illustrates a pocketed bracket 1', having an angled leg 1'' and centrally positioned depending spindle 2''.

In this modified form of the holder securing bracket, the gunwale of the boat, has permanently fastened thereto, an oarlock housing 13 and said housing, when not used in connection with an oarlock, may have fitted therein the spindle 2'' of the holder bracket, it being understood that said bracket is securely clamped to the oarlock housing, by a threaded spindle 14, which spindle is carried by the leg 1' and its inner end engages the housing, whereby the associated bracket is frictionally held.

As illustrated in Figure 9 of the drawings, the armed rod holder, is supported upon a head shank 15, which shank extends at an outward angle with reference to the gunwale of boat and the lower end of this shank, is an integral part of a gunwale clip 15', that is suitably secured to said boat gunwale A.

From the foregoing description it is manifest, that with the equipment disclosed, the fish pole holder, may be anchored to any part of a boat, to suit the taste of the fisherman, and when there is no removable anchor bracket mechanism for the holder, the same may be mounted in a standard oarlock housing.

I claim:

1. A fishpole holder comprising an anchor bracket, a shank extending therefrom, a semi-spherical head carried by the shank, having a bolt extending therefrom, a slotted cup mounted upon the head, having corrugations transversely disposed relative to the cup slot, a toothed block mounted upon the head bolt, engaging the cup corrugations, a clamping nut for the block, in threaded connection with the bolt and arms extending from the cup terminating with offset upper and lower forks for the support of a pole.

2. A fishpole holder comprising an anchor bracket having a pocket therein, a shank pivotally adjusted in the pocket, a semi-spherical head carried by the shank having a bolt extending therefrom, a slotted cup mounted upon the head, having corrugations transversely disposed relative to the cup slot, a toothed block mounted upon the head bolt engaging the cup corrugations, a wing clamping nut for the block, in threaded connection with the bolt and arms extending from the cup having transversely projecting upper and lower hole support forks, whereby either a standard pole or pole carrying a reel may be fitted thereto.

3. A fishpole comprising an anchor bracket having an upper pocket provided with apertures and a depending lug portion, adapted to engage the outer face of a boat gunwale, an inner clamping pad fitted to the other face of the gunwale, bolts carried by the clamping pad engageable with the bracket, a shank in pivotal union with the bracket pocket, adapted to be adjusted at various angles and held by a key engaging the pocket apertures and said shank, a spherical head carried at the free end of the shank, a spherical cup mounted upon the head, having arms extended therefrom terminating with an upper and lower fork, a bolt extending from the head through the cup slot, a block mounted upon the bolt and a nut in threaded union with the bolt, for clamping the block, whereby the arms and associated forks may be adjusted at various vertical and horizontal angles.

HUGH R. AGNER.

No references cited.